United States Patent [19]

Ananthapadmanabhan et al.

[11] Patent Number: 4,765,834
[45] Date of Patent: Aug. 23, 1988

[54] PROCESS FOR THE RECOVERY OF METAL VALUES

[75] Inventors: Kavssery P. Ananthapadmanabhan, Spring Valley, N.Y.; Errol D. Goddard, Haworth, N.J.

[73] Assignee: Union Carbide Corporation, Danbury, Conn.

[21] Appl. No.: 871,747

[22] Filed: Jun. 9, 1986

[51] Int. Cl.$^4$ .............................................. B01D 11/04
[52] U.S. Cl. ........................................ 75/108; 75/109; 75/117; 75/118 R; 75/119; 75/120; 75/121; 423/8; 423/24; 423/54; 423/139; 423/DIG. 14; 210/634
[58] Field of Search .............. 75/101 BE, 118 R, 121, 75/119, 108, 109; 423/24, 139, DIG. 14, 8, 54; 210/660, 663, 670, 688, 634

[56] References Cited

U.S. PATENT DOCUMENTS

| | | | |
|---|---|---|---|
| 3,214,248 | 10/1965 | Schwenk et al. | 423/24 |
| 3,558,288 | 1/1971 | Burrows | 423/24 |
| 4,507,268 | 3/1985 | Kordosky | 423/DIG. 14 |

OTHER PUBLICATIONS

Lo, Teh C. et al., *Handbook of Solvent Extraction,* John Wiley & Sons Inc., (1983), pp. 12–17, 629–647, and 653–655.

Zvarova, T. I. et al., "Liquid–Liquid Extraction in the Absence of Usual Organic Solvents: Application of Two-Phase Aqueous Systems Based On a Water-Soluble Polymer" Mikrochimica Acta, 1984, 449–458 (Russia).

*Primary Examiner*—Robert L. Stoll
*Attorney, Agent, or Firm*—Steven H. Flynn

[57] ABSTRACT

A process for the selective concentration of metal values in solution wherein said metal-containing solution is contacted with a multiple-phase system having a common solvent, thereby causing the preferential migration of metal values into one phase of said multiple-phase system. The phases of the system may then be isolated and the metal values recovered therefrom by conventional techniques.

10 Claims, No Drawings

PROCESS FOR THE RECOVERY OF METAL VALUES

BACKGROUND OF THE INVENTION

1. Field of the Invention

This invention relates to a process for the selective concentration of metal values present in solution. In particular, the present invention employs a multiple-phase system having a common solvent and the preferential affinity of the metal values for one of the phases of said multiple-phase system. A metal-containing phase may thereafter be isolated and the metal values recovered therefrom, allowing for the recycle of the liquid from the isolated phase for reestablishing a multiple-phase system.

2. Prior Art

In the recent past, technology relating to the recovery of metal values has received increased attention. This attention has focused on processes varying from the refining of raw ores to the removal of trace amounts of metals from industrial waste streams. In the area of ore refining, this recent interest is due in part to the increasing scarcity of high grade ores and the attractive prices which refined metals command. Environmental concerns stemming from the release of metal-containing industrial effluent streams have undoubtedly contributed to the second area of research.

The refining of crude ores into high purity metals frequently involves a process, commonly known as solvent extraction, wherein an aqueous leaching solution is first contacted with the ore, thereby producing an aqueous metal-containing solution. This is followed by the establishment of a two-phase system through addition of a diluent comprising a water-immiscible hydrocarbonaceous liquid. Extractants are then typically added to aid in the migration of selected metal values to the hydrocarbon phase in which they are preferentially soluble. The selected metals are thereby concentrated in the hydrocarbon phase which can then be decanted and the selected metals removed therefrom, typically into a virgin aqueous phase through a process known as stripping. The metal values may then be recovered from the aqueous phase by conventional methods such as sedimentation, formation of metal hydroxide precipitates and subsequent filtration of the metal-containing precipitates, crystallization or electrolytic reduction.

The use of solvent extraction in the isolation of material from an aqueous solution was disclosed as early as 1903 in U.S. Pat. No. 744,795. This reference discloses the use of aliphatic or aromatic hydrocarbonaceous solvents in the establishment of the two-phase systems. The use of extractants such 8-hydroxyquinone, dithizone and phenanthroline was also disclosed.

with the emergence of the nuclear industry, commercial application of solvent extraction technology flourished. For example, U.S. Pat. No. 2,564,241 discloses the concentration of uranium from its ores through solvent extraction employing alkylamine extractants. Other commonly used extractants employed in the refinement of uranium are di(2-ethylhexyl) phosphoric acid as well as secondary, tertiary and quaternary amines.

In addition to the refining of uranium, solvent extraction has been proposed for the isolation of many metals from their ores and is currently commercially employed in the refining of copper, nickel, cobalt, chromium, boron, calcium, vanadium, molybdenum, tungsten, zinc, gold, rare earths, platinum group metals, tantalum, niobium, zirconium and hafnium. For example, boron may be recovered from brines through solvent extraction with water-insoluble organic diluents, such as kerosene, containing from 0.8 to 15.0 percent volume of hydroxy oximes, as disclosed in U.S. Pat. No. 4,324,771.

However. the refining of metal-containing ores through the use of solvent extraction is not without problems. The majority of these problems stem from the use of the organic solvent itself due to its relatively high initial cost, the environmental, fire and health hazards which it typically poses, as well as the economic costs associated with its containment.

In response to these concerns, refining techniques wherein no organic solvent is employed have been proposed. For example U.S. Pat. No. 4,321,089 discloses a process for the recovery of molybdenum and rhenium metals from their sulfide ores which involves the application of microwave energy to the ore material in the presence of oxygen or chlorine, followed by recovery of the metals from the respective metal oxides and chlorides. While avoiding the solvent-imposed toxicity problems. this process can be readily seen to be both energy and capital intensive, as well as raising its own environmental concerns due to the use of microwave radiation and chlorine gas.

As previously mentioned, metal recovery in areas other than ore refinement has also received increased attention in the recent past. For example, due to the environmental and health concerns now being attributed to the release and contact with heavy metals such as lead, mercury, arsenic, chromium, cadmium and vanadium, the removal of these materials from industrial effluent streams has been the focus of recent research. For example, U.S. Pat. No. 3,769,205 discloses a process for the recovery of mercury from effluent streams through a solvent extraction process employing mixtures of organic sulfides or disulfides. U.S. Pat. No. 3,856,917 discloses a process whereby chromium may be recovered from aqueous waste streams containing hexavalent chromium through solvent extraction followed by extraction of the chromium-containing hydrocarbon phase with an aqueous sodium chromate solution. The chromium may then be recovered as sodium bichromate. U.S. Pat. No. 4,349,514 discloses a process for the recovery of chromic acid from aqueous waste streams through electro-dialysis, sulfuric acid addition and solvent extraction. U.S. Pat. No. 4,425,236 discloses a method for the recovery of cadmium from cadmium-containing aqueous waste streams through solvent extraction employing water-insoluble organic polysulfide diluents. U.S. Pat. Nos. 3,258,307 discloses a method for the separation of cadmium and zinc from an aqueous solution of their sulfates employing an extraction using an organic quaternary ammonium halide diluent. U.S. Pat. No. 4,317,804 discloses the removal of ferric ion from aqueous streams through solvent extraction using a $C_{6-12}$ dialkyl phosphoric acid extractant in a water-insoluble hydrocarbonaceous diluent.

However, all of the above processes employ solvent extraction techniques which again impose their own toxicity problems as well as the high costs associated with their minimization.

Economic considerations have further dictated that methods be developed for the recovery of valuable metals such as gold, silver, platinum and tungsten from media other than virgin ores. For example, silver is often reclaimed from silver-containing photographic waste material prior to its disposal. Silver and platinum are also routinely reclaimed from spent catalytic materials. Copper is further present in streams produced during the etching of printed circuit boards in concentrations sufficient to warrant its recovery. Chromium is present in sufficient concentrations in effluent streams produced during the tanning of leather to call for its recovery based upon economic as well as environmental considerations. However, the methods employed in the recovery of these metal values typically involve solvent extraction techniques and therefore continue to suffer from the drawbacks described above.

Techniques for the recovery of these materials employing methods other than solvent extraction have therefore also been developed. For instance, U.S. Pat. No. 4,332,584 discloses a process for the recovery and recycle of chromium values produced during the tanning of leather wherein a chromium-containing stream is de-watered and pyrolyzed followed by removal of the chromium from the residue by leaching with sulfuric acid. It is readily apparent that this alternative to solvent extraction is energy intensive and employs substances which simply raise different toxicological and environmental concerns. U.S. Pat. Nos. 3,829,549, 3,982,932 and 4,135,976 all relate to the recovery of silver from photographic processing solutions through the use of bacteria or bacterially-produced enzymes. While succeeding in avoiding the toxicological problems associated with solvent usage, these processes instead suffer costly operating constraints such as maintenance of proper pH, temperature and oxygen content of the liquid media. Furthermore, these processes require subsequent separation of the silver-containing compounds from the resulting bacterial population, thereby necessitating further process steps and the additional equipment. U.S. Pat. No. 4,428,773 discloses a process for the recovery of copper values from spent etching solutions produced in the manufacture of printed circuit boards. This process involves contacting the etchant solution with formaldehyde in titanium vessels under an oxygen-containing atmosphere at a pH of between 12 and 14 and temperatures of from 200°-210° F. This process can also be seen to employ toxic reactants as well as to require severe operating conditions and high capital investment in equipment.

Affinity partitioning has been employed in the separation of biological material and involves the establishment of multiple, distinct phases in a common solvent through the addition of substances such as polymeric materials, which produce immiscible phases and the selective affinity of a molecule of biological material for one phase over another. Aqueous two-phase systems have been known since the late nineteenth century from the work of Beijerinck, who initially disclosed the formation of aqueous bi-phase systems composed of agar and gelatin.

Affinity partitioning has offered the biotechnology industry the potential of improved recovery of cellular components, such as enzymes, in applications on an industrial scale as this procedure is not dependent upon particle size as are conventional techniques such as filtration and centrifugation. Furthermore, affinity partitioning offers the additional benefit of allowing the use of systems wherein water is the only solvent present, thereby avoiding such problems as denaturation of the biological material through exposure to non-aqueous media.

Examples of the formation of aqueous multiple-phase systems and their use in the isolation and recovery of biological material include U.S. Pat. No. 4,144,130 which discloses its use in the isolation of enzymes from other cellular matter. U.S. Pat. No. 4,343,735 discloses the isolation of interferon through the use of affinity partitioning, while U.S. Pat. No. 4,207,200 discloses its use in the recovery of deoxyribonucleic acid. The isolation of human coagulation factors VII and VIIa through the use of this technology is further disclosed in U.S. Pat. No. 4,470,969. The use of affinity partitioning has further been utilized in the isolation of enzymes and production of enzyme-containing detergent compositions as disclosed in Applicants' co-pending applications U.S. application Ser. Nos. 728,241, 728,242, and 728,243.

However, as stated above, this technology has not been taught or suggested for use in the recovery of metal values from solution.

In view of the above discussed inadequacies associated with the use of solvent extraction techniques, there is a need for a method for the separation and concentration of metal values present in solution which does not employ a toxic organic phase and therefore does not present a health or ecological hazard. Furthermore, there is a need for such a method which is neither energy nor capital intensive.

It is therefore an object of the present invention to provide a process for the separation or concentration of metals which does not employ the toxic materials commonly used in solvent extraction.

It is further an object of the present invention to provide a process for the separation or concentration of metals which is neither capital nor energy intensive.

It is still another object of the present invention to provide a process for the separation or concentration of selected metals from solutions containing mixtures of metals.

SUMMARY OF THE INVENTION

This invention provides the partitioning, and/or concentration, of metal values present in solution through the use of a multiple-phase system having a common solvent and the relative affinity of a metal for one of said phases of the system.

This invention further provides the recovery of concentrated metal values from solution.

In a preferred embodiment of the present invention, soluble additives which act to enhance the migration of metal values in one phase of the multiple-phase system are employed.

In yet another embodiment of the present invention, polymeric phase-forming materials functionalized so as to enhance the selective migration of metal values to one phase of the multiple-phase system are employed.

DETAILED DESCRIPTION OF THE INVENTION

In accordance with the present invention, the metals which are recoverable through use of the claimed techniques are those which are both soluble in the solvent employed in the multi-phase system and exhibit an electrostatic charge while in solution. Through use of terms "metal"; "metal values" or "metal ion(s)", what is intended are metals which exist in solution either as bare ions or as soluble metal-containing complexes. Therefore, materials such as $Cu^{+2}$ and $AuCl_4^{-2}$ both fall within the meaning of these terms as used herein by Applicants. Through use of the terms "multiple-phase systems", "multi-phase systems" and "bi-phase systems", Applicants mean systems possessing at least two immiscible phases having a common solvent. Examples of metals which may be concentrated and recovered through use of the present invention include, but are not limited to, soluble species and complexes of copper, zinc, palladium, iron, nickel, tungsten, silver, gold, platinum, uranium, cadmium, chromium, selenium, cobalt, rhenium, mercury and mixtures thereof. Solutions containing mixtures of two or more metals may also be separated and/or concentrated in accordance with the present process.

The multi-phase system which is employed in the instant invention are those which (1) have a common solvent and (b 2) possess at least two immiscible phases, at least one of which will interact with the charged metal species present in solution.

While not wishing to be bound to a particular mechanism or theory of operation for the present invention, a brief discussion of the mechanisms which are believed to be responsible for the separation of metals claimed herein perhaps offers the best route to an understanding of the present invention. It appears that the preferential migration of metal ions to one phase of a multi-phase system is due to an interaction between the metal ions and the materials contained in the phases of the multiple-phase system. This interaction may be either a repulsion or an attraction. The migration of specific metal ions within a multiple-phase system will depend upon the net interaction of the metal ions and the phases of the multiple phase system. This interaction may be relatively weak, such as in the case of a dipolar interaction between, for example, the attraction between a metal cation and the unpaired electrons present on an oxygen atom of a polyalkylene glycol. In contrast, this interaction may be relatively strong as in the case when electrostatic forces are in operation. By way of illustration, one could, for example, concentrate copper ions in an aqueous system containing polyethylene glycol and dextran as the phase-forming materials in view of the well known association of metal ions with polyethers. The copper cations should be attracted to the free electrons present on the polyethylene glycol while being less affected by the dextran phase. Migration of copper ions to the polyethylene glycol-rich phase would therefore result. Furthermore, one could employ a system, such as one composed of polyethylene glycol and sodium sulfate. Here, since the negatively charged sulfate ions should more strongly interact with the positively-charged copper ions than would the polyethylene glycol-rich phase, the copper ions would selectively migrate into the sulfate-rich phase. As just stated, concentration of metal ions within a given phase will depend upon the charge of the metal ion and its interaction with each of the phase-forming materials with migration of the metal ions being governed by the respective magnitudes of these attractions.

As previously stated, the present invention requires the use of multiple phase systems having a common solvent. Aqueous and non-aqueous solvent systems are well known in the art. For instance, the following non-aqueous solvent systems are known.

| Solvent | Phase-Forming Materials |
| --- | --- |
| benzene | rubber, polystyrene |
| methyl ethyl ketone | nitrocellulose, polystyrene |
| acetone | polyvinylacetone, polyvinylacetate |
| chloroform | polystyrene, polyvinylacetone |

While non-aqueous systems may be employed in the practice of the present invention, aqueous systems are preferred. However, the following description of aqueous systems should not be interpreted as a limitation of the present invention to their use alone.

Aqueous multi-phase systems which may be used in the present invention are well known from the separation of biological matter. For example, see the *Partition of Cell Particles and Macromolecules* by P. Albertsson, Uppsala, 1st edition (1960), 2nd edition (1971). These multi-phase systems can be roughly divided into two types; namely those in which the phase-forming materials are polymeric materials and those composed of a single polymeric material in conjunction with an inorganic material. Both types of aqueous systems may be employed.

Examples of multi-phase systems wherein both phase-forming materials are polymeric in nature include, but are not limited to, dextran/water-soluble copolymer of sucrose and epichlorohydrin, dextran/hydroxypropyldextran, polyethylene glycol/dextran sulphate, dextran/polyethylene glycol, polypropylene glycol/methoxypolyethylene glycol, polypropylene glycol/polyethylene glycol, polypropylene glycol/polyvinyl alcohol, polypropylene glycol/polyvinyl pyrrolidone, polypropylene glycol/hydroxypropyldextran, polypropylene glycol/hydroxypropyldextran, polypropylene glycol/dextran, polyethylene glycol/polyvinyl alcohol, polyethylene glycol/polyvinyl pyrrolidone, polyethylene glycol/water-soluble copolymer of sucrose and epichlorohydrin, polyethylene glycol/water-soluble starch, polyethylene glycol/glycogen, polyvinyl alcohol/methyl cellulose, polyvinyl alcohol/hydroxypropyldextran, polyvinyl alcohol/dextran, polyvinyl pyrrolidone/methyl cellulose, polyvinyl pyrrolidone/dextran, methyl cellulose/hydroxypropyldextran, methyl cellulose/dextran and ethylhydroxyethyl cellulose/dextran.

Aqueous multi-phase systems which are employable in the present invention which are composed of a polymeric material and at least one inorganic material are also well known in the art. The polymeric materials include polyalkylene glycols such as polyethylene glycols, and polypropylene glycols, polyvinyl alcohol, polyvinyl pyrrolidone. Representative examples of inorganic salts which may be employed to form multiphase systems with the above-listed polymeric materials include alkali metal and alkaline earth metal citrates, carbonates, silicates, sulfates, formates, succinates, tartarates and phosphates. Ammonium salts of these anionic materials may also be employed.

The systems can further contain additional materials including pH buffers such as tris(hyroxymethyl)-aminomethane, morpholine ethane sulfonate and citrate. Substances which serve to modify the pH of the system aay also be employed as long as they do not unduly degrade the other components of the system.

The multi-phase system employed will, of course, depend upon the metal(s) which one wishes to partition as well as other considerations such as the compatibility of the phase-forming materials with any other components contained in the metal-containing medium. The solvent of the multi-phase system must be miscible with the solvent of the metal-containing solution. Economic considerations will also be a factor. Simple experimentation will identify the best systems for each metal polyalkylene glycol/alkali metal sulfate aqueous systems to function satisfactorily in the separation and concentration of metal-containing aqueous streams. Preferred are such systems containing from about 1 to about 30 wt. % polyethylene glycols having an average molecular weight of about 200 to about 100,000 and from about to about 20 wt. % of sodium sulfate.

The sequence of the formation of the multi-phase system is not critical. The metal-containing solution may be introduced into an established multi-phase system or it may first be introduced with one of the phase-forming materials. However, irrespective of the sequence of introduction of the metal-containing solution, sufficient agitation should then be provided to the final solution to ensure adequate mixing of the multi-phase system's components, complete distribution of the components of the system and maximization of the metal ion partition.

The reaction conditions present during the partition procedure are also not critical. The temperature and pH should be maintained within limits so as to not unduly affect the components of the multi-phase system from functioning in their intended manner. For instance, temperatures must be maintained above the point where the fluidity of the phases is affected and below a temperature where degradation of the materials contained therein does occur. Generally, this ranges from about 5° C. to about 100° C. at ambient pressure for aqueous systems. Similarly, the pH of the system should be maintained at a point where no undesired precipitates form.

While the reaction conditions may not be critical, it has been found that the selective partitioning of metal ions within a given multi-phase system may be maximized through their proper manipulation. For instance, Applicants have found that changing the pH of a system can exert a marked effect on the partitioning of a given species metal ion contained therein. It is believed that this is due to pH-induced changes in the electro-chemical character of the metals and the phase-forming materials, thereby modifying their interaction. As the influence of pH will depend on the composition of a multi-phase system as well as the type(s) of metal ions contained therein, no general statement can here be given as to how to best optimize partition of metal ions. However, examples contained herein serve to demonstrate this effect.

Once the system has been allowed to establish distinct phases, the phases may be isolated. Conventional methods may then be employed to recover the metal values from the isolated phase. For example, metal hydroxide precipitates may be formed through increasing the pH of the isolated phase. The precipitates may then be isolated through filtration. Alternatively, electrolytic reduction may be used to extract the metal values from the isolated phase.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Example 1

A two-phase aqueous system, hereinafter referred to as System A, was formulated in a 50 cc separatory funnels using the components set forth below.

1. 6.67 grams of a 60.0 wt. % solution of polyethylene glycol having an average molecular weight of about 1450, (manufactured by Union Carbide Corporation and marketed under the designation of CARBOWAX*-polyethylene glycol (PEG) 1450, and

*Trademark 2. 10.0 grams of a 15.0 wt. % aqueous solution of sodium sulfate.

To this system was added 0.2 grams of an aqueous 1 wt. % solution of copper sulfate. The total weight of the system was adjusted to 20.0 grams through the addition of distilled water. The pH of the solution was adjusted to 3.8 through the use of sulfuric acid. The funnel was then agitated to thoroughly mix its contents and then was left undisturbed to allow reestablishment of the two-phase system.

The upper phase was isolated and analyzed to determine the concentration of copper ion present. Evaluation of the separation ability exhibited by these systems is typically expressed through a term known as a "partition coefficient" which is defined as the concentration of a given material in the upper phase divided by its concentration in the lower phase. It was determined that the system possessed a partition coefficient for copper ion of 0.007. Based upon the respective volumes of the phases, the bottom salt-rich phase contained 98.71% of the copper ion present in the system.

Example 2

To a fresh 16.67 grams of System A was added 0.2 grams of an aqueous 1 wt. % solution of silver nitrate. The total weight of the system was adjusted to 20.0 grams through the addition of distilled water. The pH of the solution was adjusted to 3.7 through the use of sulfuric acid. The funnel was agitated to thoroughly mix its contents and then was allowed to reestablish the two-phase system.

The upper phase was isolated and analyzed to determine the presence of silver ion. It was determined that the system possessed a partition coefficient for silver ion of 0.19. The bottom salt-rich phase contained 74.1 % of the silver ion present in the system.

Example 3

To a fresh 16.67 grams of System A was added 2.0 grams of an aqueous 0.1 wt. % solution of silver nitrate. The total weight of the system was adjusted to 20.0 grams through the addition of distilled water. The pH of the solution was adjusted to 5.0 through the use of sulfuric acid. The funnel was agitated to thoroughly mix its contents and then was allowed to reestablish the two-phase system.

It was noted that upon reestablishment of the two-phase system, a distinct layer of material was seen to exist at the interface.

The phases were isolated and analyzed to determine the presence of silver ion. Combining the silver ion content of the bottom phase and the interphase, it was determined that the system possessed a partition coefficient for silver ion of 0.101 with the bottom phase containing 90.9 % of the silver ion present in the total system.

Example 4

To a fresh 16.67 grams of System A was added 0.2 grams of an aqueous 1 wt. % solution of tungstic acid. The total weight of the system was adjusted to 20.0 grams through the addition of distilled water. The funnel was agitated to thoroughly mix its contents and was then allowed to reestablish the two-phase system.

The upper phase was isolated and analyzed to determine the presence of tungstate ion. Through this calculation, it was determined that the system possessed a partition coefficient for tungstate of 1.375. The bottom salt-rich phase contained 27.7% of the tungstate present in the system.

Example 5

To a fresh 16.67 grams of System A was added 1.0 gram of an aqueous 0.2 wt % solution of nickel chloride. The total weight of the system was adjusted to 20.0 grams through the addition of distilled water. The funnel was agitated to thoroughly mix its contents and was then allowed to reestablish distinct phases.

The upper phase was isolated and analyzed to determine the presence of nickel ion. Through this calculation, it was determined that the system possessed a partition coefficient for nickel ion of 0.01 The bottom salt-rich phase contained 99.3% of the nickel present in the system.

Example 6

To a fresh 16.67 grams of System A was added 1.0 gram of an aqueous 0.2 wt. % solution of ferrous sulfate. The total weight of the system was adjusted to 20.0 grams through the addition of distilled water. The funnel was agitated to thoroughly mix its contents and was then allowed to reestablish distinct phases.

The upper phase was isolated and analyzed to determine the presence of iron ion. Through this calculation, it was determined that the system possessed a partition coefficient of 0.04. The bottom salt-rich phase contained 98.6% of the iron present in the system.

Example 7

A two-phase aqueous system was formulated in a 50 cc separatory funnel using the components set forth below:

(1) 8.0 grams of a 50.0 wt. % aqueous solution of polyethylene imine having an average molecular weight of about 1800, (manufactured by Polyscience Inc.) and (2) 10.0 grams of a 20.0 wt. % aqueous solution of sodium sulfate.

To this system was added 2.0 grams of an aqueous 0.01 wt. % solution of silver nitrate. The pH of the solution was found to be 6. The funnel was agitated to thoroughly mix its contents and then was allowed to reestablish the two-phase system.

It was noted that upon reestablishment of the two-phase system, a distinct layer a material was seen to exist at the interface.

The phases were isolated and analyzed to determine the presence of silver ion. It was determined that the system possessed a partition coefficient for silver ion of 4.81.

Example 8

A two-phase aqueous system was formulated in a 50 cc separatory funnel using the components set forth below:

(1) 8.0 grams of 50 wt. % solution of polyethylene glycol having an average molecular weight of about 1450, (manufactured by Union Carbide Corporation and marketed under the designation of CARBOWAX*-polyethylene glycol (PEG) 1450, and
*Trademark (2) 10 grams of a 20 wt. % aqueous solution of sodium citrate.

To this system was added 1.0 grams of an aqueous 0.2 wt. % solution of copper sulfate. The total weight of the system was adjusted to 20.0 grams through the addition of distilled water. The funnel was agitated to thoroughly mix its contents and then was allowed to reestablish the two-phase system.

The upper phase was isolated and analyzed to determine the concentration of copper ion present. It was determined that the system possessed a partition coefficient of 0.2. The bottom salt-rich phase contained 88.3% of the copper ion present in the system.

Example 9

A two-phase aqueous system was formulated in a 50 cc separatory funnel using the components set forth below.

(1) 8.0 grams of a 50 wt. % solution of polyethylene glycol having an average molecular weight of about 1450, (manufactured by Union Carbide Corporation and marketed under the designation of CARBOWAX*-polyethylene glycol (PEG) 1450, and
*Trademark (2) 10.0 grams of a 15.0 wt. % aqueous solution of sodium sulfate.

To this system was added 1.0 grams of an aqueous 0.1 wt. % solution of platinum. The total weight of the system was adjusted to 20 grams through the addition of distilled water. The pH of the solution was adjusted to 2 through the use of hydrochloric acid. The tube was agitated to thoroughly mix its contents and then was allowed to reestablish the two-phase system.

The phases were isolated and analyzed to determine the concentration of platinum ion present in each. It was determined that the system possessed a partition coefficient of 3.25 with respect to platinum.

Examples 1 through 9 clearly demonstrate that metal ions may be preferentially partitioned in an aqueous two-phase system rather than being randomly distributed throughout the system with specific metal ions demonstrating a marked preference for one phase over the other. Moreover, the partitioning of one type of metal ion in a given system appears to operate independently of other ions present in the system. Furthermore, as shown through a comparison of Examples 2 and 3, the effect of modifying the pH of a multiple-phase system on the partition coefficient of a specific metal ion in that system is demonstrated.

As previously noted, Applicants have further found that it is possible to further modify the selective partitioning of metal values in multi-phase systems through the use of certain soluble reagents. These reagents will hereinafter be referred to as "PTA's" (phase transfer agents). This modification may be reflected by either an increase or reduction of the partition coefficient of a metal species in a given system when compared to the partition coefficient of that species of metal ion without the addition of a PTA.

Phase transfer agents have been used in the recovery of metals from solution through the use of solvent extraction and in the field of analytical chemistry. These reagents are generally characterized by certain qualities. They must be (1) possess a site with which the metal ion may interact, and (2) possess a functionality which will preferentially interact with one of the phase-forming materials. Their interaction with metal ions is thought to be of an electro-chemical nature, as in the previously described case of the metal-phase interactions. Their interaction with phase forming materials may also depend upon a charge differential, or it may be of a hydrophobic or hydrophilic nature. For example, phase transfer agents used in solvent extraction possess an aromatic group or long-chain hydrocarbonaceous group which, due to its hydrophobic nature, selectively migrate to the solvent phase. From the field of bioseparations, it is also known that hydrophobic groups similarly migrate into the polyethylene glycol-rich phase of a polyethylene glycol inorganic salt multiple-phase system.

The extractants which have been employed in the field of hydrometallurgical solvent extraction may be classified into four classes based upon their chemical structure and their interaction with metal ions. These groups are acid extractants, acid chelating extractants, basic extractants and solvating extractants. Examples of these materials and their commercial uses are set forth below.

| Class | Example | Use |
|---|---|---|
| (1) acid extractants | carboxylic acids | Cu—Ni separation |
|  | alkyl phosphoric acids | U extraction |
| (2) acid chelating extractants | hydroxyoximes | Cu, Ni, Pd extraction |
|  | B-diketones | Cu extraction |
| (3) basic extractants | secondary amines | U extraction |
|  | tertiary amines | U, Co, W, Va extraction |
| (4) solvating extractants | alkyl sulphides | Pd extraction |

These classes of solvent extractants are explained in more detail in *Hydrometallurgy-Research, Development and Plant Practice*, Proceedings of the 3rd International Symposium on Hydrometallurgy, edited by K. Osseo-Asare and J. D. Miller. The Metallurgical Society of AIME 1982 (pp. 1-87). These materials are also disclosed in *Quantitative Chemical Analysis* by I. M. Kolthoff et al, fourth edition. The Macmillan Company (1969), and, in particular chapter 14 thereof, from pp. 24-25.

The above brief reference to solvent extractants has been included herein since these materials, or their derivatives, may be employed in the instant process depending upon their solubility in the solvent employed in the establishment of the multiple-phase system. The extractant must be soluble in the multiple-phase system. Therefore, some extractants employed in solvent extraction systems which possess highly hydrophobic groups, such as $C_{18-24}$ hydrocarbonaceous chains or aromatic groups, may not generally be used in the practice of present invention. However, their use in solvent extraction techniques may be used as a guide toward the potential application of their less hydrophobic derivatives in the present invention.

The effect of addition of PTA's to aqueous multiple-phase systems can be seen through the following discussion. In an aqueous multi-phase system comprised of polyethylene glycol and dextran, a cation such as $Cu^{+2}$ should selectively migrate to the polyethylene glycol-rich phase due to its positive charge and its interaction with the unbound electrons on the glycol. However, addition of phosphate ion to the system, such as through the addition of sodium phosphate, causes selective migration of copper ions to the dextran-rich phase. It is believed that this is caused by a complexation of the copper and phosphate ions, coupled with a preferential partitioning of the complex in the dextran phase.

The effects of hydrophobic and hydrophilic interactions can be readily seen through introduction of silver ion, in the form of silver nitrate, into an aqueous multi-phase system of polyethylene glycol and sodium sulfate. Without use of a PTA, silver ions selectively migrate into the sulfate-rich lower phase, presumably due to electrostatic interaction. However, upon the addition of a surfactant, such as sodium dodecylsulfate, it is found that preferential migration of silver ion to the polyethylene glycol-containing phase occurs. This is believed to be attributable to an interaction between the silver ion and the surfactant, coupled with the surfactant's hydrophobic character.

It should here be noted that the complexation, or interaction, which occurs between the metal cation and the PTA can lead to the formation of both soluble and insoluble products. However, the formation of insoluble metal-containing products does not hinder the operation of the claimed invention as these products, will selectively migrate within the multiple-phase system. For example, addition of the PTA $Na_2S$ to a silver-containing polyethylene glycol/sodium sulfate aqueous multiple-phase system results in the formation of AgS which is insoluble in the system. The AgS precipitate will, however, selectively migrate to the upper polyethylene glycol-rich phase due to its hydrophobic character. In contrast, insoluble products such as $Ag(OH)_2$ will selectively migrate to the sulfate-rich phase due to their hydrophilic nature.

These soluble reagents may be further divided into two groups, namely reagents which are relatively non-specific in the metal with which they interact and those with a high degree of specificity.

Examples of non-specific PTA's include organic acids such as oleic and tannic acids, $Na_2S$, benzotriazole, surfactants such as sodium dodecyl sulfonate, diethyldithiocarbamic acid, acetylacetone, rhodamine B, cupferron, phosphates, phosphonates and teriary amines. Examples of reagents which are specific in their actions include chelating agents with groups such as oximes, hydroxyoximes, and xanthates.

These reagents may be employed in amounts ranging up to stoichiometric excesses relative to the metal ions present in solution. Often their solubility in the solvent of the system imposes an upper limit on their inclusion.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

Example 10

A two-phase aqueous system, hereinafter referred to as System B, was formulated in a 50 cc separatory funnel using the components set forth below.

1. 13.336 grams of a 60.0 wt. % solution of polyethylene glycol having an average molecular weight of about 1450, manufactured by Union Carbide Corporation and marketed under the designation of CARBOWAX*-polyethylene glycol (PEG) 1450, and

*Trademark 2. 18.664 grams of a 15.0 wt. % aqueous solution of sodium sulfate.

To this system was added 4.0 grams of an aqueous 0.1 wt. % solution of silver nitrate and 4.0 grams of a 0.1% solution of Rhodamine B. The pH of the solution was adjusted to 2.8 through the use of sulfuric acid. The funnel was agitated to thoroughly mix its contents and then was left undisturbed to allow reestablishment of the two-phase system.

The phases were then isolated and analyzed to determine the concentration of silver ion present in each. It was determined that the lower phase of the system contained less than 1 ppm of silver. The system therefore possessed a partition coefficient for silver ion approaching infinity.

Example 11

To a fresh 32.00 grams of System B was added 4.0 grams of an aqueous 1 wt. % solution of silver nitrate and 4.0 grams of tannic acid. The pH of the solution was adjusted to 5.9. The funnel was agitated to thoroughly mix its contents and then was allowed to reestablish the two-phase system.

The phases were then isolated and analyzed to determine the presence of silver ion. It was determined that the system again possessed a partition coefficient for silver ion approaching infinity since the bottom phase contained less than 1 ppm of silver ion.

Example 12

To a fresh 32.00 grams of System 8 was added 4.0 grams of an aqueous 0.1 wt. % solution of silver nitrate and 4.0 grams of a 0.1% solution of $Na_2S$. The pH of the solution was adjusted to 5.5 through the use of sulfuric acid. The funnel was agitated to thoroughly mix its contents and then was allowed to reestablish the two-phase system.

The phases were isolated and analyzed to determine the presence of silver ion. It was determined that the system possessed a partition coefficient for silver ion approaching infinity with the bottom phase containing less than 1 ppm of silver ion.

Example 13

To a fresh 32.00 grams of System B was added 4.0 grams of an aqueous 0.1 wt. % solution of copper sulfate and 4.0 grams of cupferron. The pH of the system was adjusted to 5.5. The funnel was agitated to thoroughly mix its contents and was then allowed to reestablish the two-phase system.

The phases were then isolated and analyzed to determine the presence of copper ion. It was determined that the system possessed a partition coefficient for copper ion of about 1.35.

Example 14

To a fresh 32.00 grams of System B was added 4.0 grams of an aqueous 0.1 wt % solution of copper sulfate and 4.0 grams of a 0.1% solution of benzotriazole. The pH of the solution was adjusted to 5.1. The funnel was agitated to thoroughly mix its contents and was then allowed to reestablish distinct phases.

The phases were then isolated and analyzed to determine the presence of copper ion. It was determined that the system possessed a partition coefficient for copper ion of 0.42.

Example 15

To a fresh 32.00 grams of System B was added 4.0 grams of an aqueous 0.1 wt. % solution of copper sulfate and 4.0 grams of a saturated aqueous solution of benzoin oxime. The pH of the system was adjusted to 5.4. The funnel was agitated to thoroughly mix its contents and was then allowed to reestablish distinct phases.

The phases were then isolated and analyzed to determine the presence of copper ion. It was determined that the system possessed a partition coefficient approaching zero since no copper was detected in the upper phase.

Example 16

To a fresh 32.00 grams of System B was added 4.0 grams of an aqueous 0.1 wt. % solution of nickel chloride and 4.0 grams of an aqueous saturated solution of dimethyl glyoxine. The pH of the solution was adjusted to 5.5. The funnel was agitated to thoroughly mix its contents and was then allowed to reestablish the two-phase system.

The phases were then isolated and analyzed to determine the presence of nickel ion. It was determined that the system possessed a partition coefficient for nickel approaching infinity since the bottom phase contained less than 1 ppm of nickel.

Example 17

Three identical two phase aqueous systems were formulated in three 50 cc separatory funnels using the component set forth below.

1. 6.67 grams of 0.60 wt. % aqueous solution of polyethylene glycol having an average molecular weight of about 1450 (manufactured by Union Carbide Corporation and marketed under the designation of CARBOWAX* polyethylene glycol 1450; and

* Trademark 2. 9.32 grams of a 15.0 wt. % aqueous solution of sodium sulfate. To each tube was then added 2.0 grams of an aqueous 0.1 wt. % solution of silver nitrate and 2.0 grams of a 0.1% aqueous solution of tannic acid. The pH's of the solutions were then adjusted to 2.0, 5.8 and 11.8 through the addition of hydrochloric acid and sodium hydroxide. The separatory funnels were agitated and were then allowed to reestablish two-phase systems.

The phases of each system were then isolated and analyzed to determine the concentration of silver ion in each. The systems having pH's of 2.0 and 11.8 were found to possess partition coefficients of about 0 since no silver ion was found to be in the upper phase. The system having a pH of 5.9 was found to possess a partition coefficient approaching infinity since all silver ions were found to be in the upper phase. It is postulated that at near neutral pH's, the carboxylate groups present on the tannic acid complex with the silver cation and the complex then migrates to the polyethylene glycol-rich phase due to the hydrophobicity of the tannic acid. In contrast, at low pH's the tannic acid is electrostatically neutral and therefore does not complex with the silver cation. At high pH's, hydroxide ions successfully compete with tannic acid for the silver ion, resulting in the formation of $AgOH^+$. In both these cases, the silver will preferentially migrate to the lower phase due to its electrostatic attraction to the sulfate anion contained therein.

Example 18

A two-phase aqueous system was formulated in a 50 cc separatory funnel using the components set forth below.

1. 6.67 grams of a 60.0 wt. % aqueous solution of polyethylene glycol having an average molecular weight of about 1450, (manufactured by Union Carbide Corporation and marketed under the designation CARBOWAX* polyethylene glycol 1450;
*Trademark
2. 10.0 grams of a 15.0 wt. % aqueous solution of sodium sulfate;
3. 2.0 grams of 0.01 wt. % aqueous solution of gold chloride;
4. 0.2 grams of a 1.0 wt. % aqueous solution of copper sulfate; and
5. 1.13 grams of a 1.0 wt. % aqueous solution of cupferron.

The contents of the funnel was thoroughly agitated and the funnel was set aside to allow for establishment of the two-phase system. The phases were then isolated and analyzed to determine their respective content of each ion.

The upper polyethylene glycol-rich phase was found to contain 92.8% of gold ion and 98.5% of the copper ion.

Example 19

A two-phase aqueous system was formulated in a 50 cc separation funnel using the components set forth below.

1. 7.5 grams of a 50.0 wt. % aqueous solution of polyethylene glycol used in Example 18.
2. 9.5 grams of a 15.0 wt. % aqueous solution of $Na_2PO_4$.
3. 0.2 grams of a 1.0 wt. % aqueous solution of copper sulfate.
4. 0.2 grams of 1.0 wt. % aqueous solution of nickel chloride.
5. 2.0 grams of 0.2 wt. % aqueous solution of salicylaldoxime.
6. Distilled water sufficient to create a solution of 20.0 grams. The pH of the solution was adjusted to 4.0 through the addition of sulfuric acid.

The contents of the funnel were thoroughly agitated and the funnel was then set aside to allow for establishment of the two-phase system. The phases were then isolated and analyzed to determine their respective concentrations of each ion.

The upper, polyethylene glycol-rich phase was found to contain 95% of the copper cations and 31.7% of the nickel cations. The system possessed partition coefficients with respect to copper and nickel of 7.3 and 0.16, respectively.

Example 20

The procedure of Example 19 was repeated except that the pH of the solution was adjusted to 5.0.

Upon analysis, the upper, polyethylene glycol-rich phase was found to contain 99.6% of the copper cations and 23.6 of the nickel cations. The system possessed partition coefficients with respect to copper and nickel of 108 and 0.11, respectively.

Examples 10-20 clearly demonstrate that metal ions may be preferentially partitioned in aqueous two-phase systems containing soluble phase transfer agents. Moreover, quantitative extraction of a given metal ion through addition of phase transfer agents is seen to be possible. Furthermore, the influence of pH upon the partition coefficient of a system for a given metal ion is readily apparent.

As previously noted, it has also been found that metal values may be selectively partitioned in multi-phase systems through the use of polymeric phase-forming materials functionalized so as to selectively modify the concentration of metal values in one phase of the multi-phase system. These functionalities are characterized by their ability to effectively interact, either through attraction or repulsion, with metal ions. This embodiment of the present invention lends itself well to commercial applications since recycling of functionalized phase-forming materials would also accomplish recycle of the partition-modifying functionalities. In contrast, in the earlier described usage of PTA's. recycle of the PTA's. The additional processing which may be required to ensure PTA recycle is not necessary in the present embodiment.

Representative examples of these functionalized materials are phase-forming polymeric materials to which are bound moieties such as acrylate, oximes, sulfate, xanthate, phosphate and amine groups. The polymeric phase-forming materials to which these moieties may be bound include, but are not limited to, polyalkylene glycols, poly(oxyalkylene) copolymers, polyvinyl alcohols and polyvinyl pyrrolidone. Preferred are graft polymers of (1) poly(oxyalkylene) copolymers or (2) polyalkylene glycols with functionalities such as acrylate, methacrylic, maleic, sulfate, phosphate, oxime and amine moieties. Particularly preferred for use as functionalized phase-forming materials are graft polymers of (1) polyloxyalkylene) copolymers having average molecular weight of from about 200 to about 100,000 and acrylic acid, and (2) polyalkylene glycols having average molecular weights of about 200 to about 100,000 acrylic acid, such that the grafted acid content is between about 1 and about 60.

The grafted polymers can be used alone or in conjunction with other phase-forming materials. For example, in the formation of an aqueous multi-phase system containing sodium sulfate as one phase-forming material, a grafted polyethylene glycol polymer may be used alone or in combination with a non-grafted polymer. If the grafted polymer represents only a minor portion of the phase-forming polymeric material, (i.e. it is used in an additive amount), grafted polymers of molecular weights greater than 100.000 may be employed. Grafting of functional groups to polymeric materials is well known in the art as shown through U.S. Pat. No. 4,146,488 which discloses the production of acrylic acid- and methacrylic acid-grafted poly(oxyalkylene) compounds and their use in metalworking fluids. U.S. Pat. No. 4,392,972 relates to graft copolymers of poly- (oxyalkylenes) and unsaturated acids, such as acrylic, methacrylic, crotonic and maleic acids, and the use of said copolymers to impart corrosion resistance to aluminum surfaces in contact with aqueous or alcoholic solutions. U.S. Pat. No. 4,514,315 relates to the production of alkylene silane grafted polyethers and their incorporation into aqueous heat transfer fluids.

The graft copolymers of organic acids useful in the present invention can, if desired, be conveniently partially or wholly neutralized to a desired pH base to provide the salt of the acid graft copolymer. Illustrative bases would include the following (although any known base can be used): ammonium hydroxide, alkali metal hydroxides, or alkaline earth metal hydroxides; or amines of the formula in their unionized form:

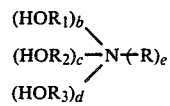

wherein R is hydrogen or alkyl having 1 to about 6 carbon atoms, each of $R_1$, $R_2$ and $R_3$ is an alkylene radical having 2 to 4 carbon atoms, e has a value of 0, 1, 2 or 3 and b, c and d each have a value of 0 or 1, with the proviso that when b, c and d each have a value of 1, then e is 0.

When an alkanolamine is employed, the preferred alkanolamine is a trialkanolamine but mono- and dialkanolamines can also be used. The preferred trialkanolamine is triethanolamine, although others, such as, trimethanolamine, methyldiethanolamine, tripropanolamine, diethylmonopropanol amine tributanolamine, and the like, can also be used if desired. Exemplary monoalkanolamines include monoethanolamine, monopropanolamine, N-methyl ethanolamine, N,N-dimethyl ethanolamine, N,N-diethyl ethanolamine, and the like. Exemplary dialkanolamines include diethanolamine, dibutanolamine, N-methyl diethanolamine, N-ethyl ethanolamine, and the like.

Other useful amines include triethylamine, di-n-propylamine. tri-n-propylamine n-butylamine, n-amylamine, di-n-amylamine, n-hexylamine, ethylene diamine, propylene diamine, ethanolamine, diethanolamine, triethanolamine, cyclohexyl-amine, dicyclohexylamine, ethyl hexylamine, N-ethyl aniline, morpholine ethanol, 1-(N-methyl)-aminohexane-2,3,4,5,6-pentol, and mixtures of mono- and di-n-alkylamines. A commercial mixture of amyl amines consisting of about 60 percent mono-n-amylamine and about 40 percent di-n-amylamine can be used, although a wide variety of other commercial amines can suitably be employed.

The sequence of the formation of the multi-phase system in the practice of this embodiment of the present invention is also not critical. The metal-containing solution may be introduced into an established multi-phase system or it may be contacted with one or more of the phase-forming liquids prior to formation of the multi-phase system. Sufficient agitation should again be provided to ensure adequate mixing of the system's components, thereby ensuring complete distribution of the components of the system and maximization of the metal ion partition.

The reaction conditions present during the partition procedure are again not critical. The temperature and pH should be maintained within limits so as to not unduly affect the components of the multi-phase system from functioning in their intended manner. For instance, temperatures must be maintained above the point where the fluidity of the phase-forming liquids is affected and below a temperature where undue degradation of materials occurs. Generally, this ranges from about 5° C. to about 100° C. at ambient pressure for aqueous systems. Similarly, the pH of the system should be maintained at a point where no undesired precipitates form. Generally, this ranges from a pH number of about 3 to about 11.

Through proper manipulation of reaction conditions, such as pH, the selective partitioning of metal ions within a multi-phase system containing functionalized polymeric materials may also be maximized. For instance, Applicants have found that changing the pH of a system can exert a marked effect on the partitioning of a given metal ion contained therein. It is believed that this is due to pH-induced changes in the electro-chemical character of the phase-forming materials. As in the case of PTA-containing systems, the influence of pH will depend on the composition of a multi-phase system as well as the type(s) of metal ions contained therein. No general statement can therefore be given as to how to best optimize partition of metal ions.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

Example 21

An acid graft copolymer is prepared using acrylic acid and a base polymer consisting of butanol started poly(oxyethylene-oxypropylene) copolymer having a molecular weight of 770 and a viscosity of 170 Saybolt seconds at 100° F. as follows:

Into a 5-liter, 3-neck round bottom flask fitted with a water condenser, thermocouple, stirrer, and means of introducing acrylic acid and catalyst, is placed 2700 gm of the polymer. By means of a heating mantle, the flask is heated to a temperature of 150° C., followed by the addition of 35 grams of tertiary-butyl perbenzoate and 312 grams of acrylic acid. The peroxide feed is then begun 10 minutes prior to starting the acid feed and both ingredients are fed over a period of 90 minutes, after which the product (herein called "Grafted Copolymer A") is allowed to cool to room temperature.

Several other acid grafted copolymers are prepared in accordance with the above procedure to provide Grafted Copolymers B, C, D, and E as listed in Table I below. The "% Graft" for the grafted copolymers of Table I is calculated on the basis of the total amount of grafting acid fed into the reaction mixture.

TABLE I

| Grafted Copolymer | Grafting Acid | % Graft | Starter | Properties of Base Polymer %* EO/PO | Molecular Weight | Viscosity (Saybolt sec. at 100° F.) |
|---|---|---|---|---|---|---|
| A | acrylic | 10% | butanol | 50/50 | 770 | 170 |
| B | acrylic | 60% | butanol | 0/100 | 710 | 165 |
| C | acrylic | 5% | butanol | 0/100 | 2051 | 1145 |
| D | acrylic | 10% | butanol | 50/50 | 4000 | 5100 |
| E | acrylic | 15% | ethylene glycol | 100/0 | 8000 | solid |

*EO = ethylene oxide
PO = propylene oxide

Example 22

A two-phase aqueous system was formulated in a 50 cc separatory funnel using the components set forth below.

1. 7.00 grams of a 30.0 wt. % solution of acrylic acid-grafted polyethylene glycol (such as Grafted Copolymer E), and
2. 10.00 grams of a 15.0 wt. % solution of sodium sulfate.

To this system was added 0.2 grams of a 1.0 wt. % solution of silver nitrate. The system was then adjusted to a total weight of 20.00 grams through the addition of distilled water. The funnel was then agitated to throughly mix its contents and was then left undisturbed to allow establishment of a two-phase system.

The phases were then isolated and analyzed to determine the concentration of silver ion present. It was determined that the upper, polyethylene glycol-rich phase contained 94.7% of the silver present in the system.

Example 23

The procedure of Example 22 was repeated except that the aqueous two-phase system was formed from the following components.

1. 6.00 grams of a 60.0 wt. % solution of polyethylene glycol having an average molecular weight of about 1450 (manufactured by Union Carbide Corporation and marketed under the designation of CARBOWAX* polyethylene glycol 1450, and
*Trademark
2. 0.667 grams of the acrylic acid-grafted polymer employed in Example 22, and
3. 10.00 grams of the sodium sulfate solution employed in Example 22.

Analysis of the isolated phases determined that the upper phase contained 98.37% of the silver present in the system.

Example 24

The procedure of Example 23 was repeated except that the amount of CARBOWAX* 1450 was increased to 8.00 grams and the amount of acrylic acid-grafted polymer was decreased to 0.4 grams.
*Trademark Analysis of the isolated phases determined that the upper phase contained 83.5% of the silver present in the system.

We claim:

1. A process for the selective concentration of metal values present in aqueous solution comprising
   (a) contacting the aqueous metal-containing solution with an aqueous bi-phase system,
   (b) isolating the phases of said bi-phase system, and
   (c) recovering the metal values from at least one of said isolated phases, wherein said aqueous bi-phase system contains at least one functionalized polymeric material in an amount such that the concentration of metal values in one phase of the bi-phase system is enhanced, said functionalized polymeric material being a polyalkylene glycol, poly(oxyalkylene) polymer or poly(oxyalkylene) copolymer to which are bound functional groups selected from the group consisting of acrylate, sulfate, xanthate, oxime, phosphate and amine moieties.

2. The process of claim 1 wherein the soluble metal values are selected from the group consisting of copper, zinc, palladium, iron, nickel, tungsten, silver, gold, platinum, uranium, cadmium, chromium, selenium, cobalt, rhenium, mercury and mixtures thereof.

3. The process of claim 1 wherein the bi-phase system is selected from the group consisting of dextran/water-soluble copolymer of sucrose and epichlorohydrin, dextran/hydroxypropyldextran, polyethylene glycol/-dextran sulphate, dextran/polyethylene glycol, polypropylene glycol/methoxypolyethylene glycol, polypropylene glycol/polyethylene glycol, polypropylene glycol/polyvinyl alcohol, polypropylene glycol/hydroxypropyldextran, polypropylene glycol/hydroxypropyl dextran, polypropylene glycol/dextran, polyethylene glycol/polyvinyl alcohol, polyethylene glycol/polyvinyl pyrrolidone, polyethylene glycol/water-soluble copolymer of sucrose and epichlorohydrin, polyethylene glycol/water-soluble starch, polyethylene glycol/glycogen, polyvinyl alcohol/methyl cellulose, polyvinyl alcohol/hydroxypropyldextran, polyvinyl alcohol/dextran, polyvinyl pyrrolidone/methyl cellulose, polyvinyl pyrrolidone/dextran, methyl cellulose/-hydroxypropyldextran, methyl cellulose/dextran and ethylhydroxyethyl cellulose/dextran.

4. The process of claim 1 wherein the bi-phase system comprises a polymer and at least one inorganic salt.

5. The process of claim 4 wherein the polymer is selected from the group consisting of polyalkylene glycols, polyvinyl alcohols and polvvinyl pyrrolidone, and the inorganic salt is selected from the group consisting of alkali metal and alkaline earth metal citrates, sulfates, carbonates, silicates, formates, succinates, tartarates and phosphates.

6. The process of claim 4 wherein the polymer comprises polyethylene glycol having an average molecular weight of from about 200 to about 100,000 and the inorganic salt comprises sodium sulfate.

7. The process of claim 1 wherein said polymeric material is an acrylic acid-grafted polyethylene glycol having an average molecular weight of from about 200 to about 100,000 and a grafted acid content between about 1 and about 60.

8. The process of claim 1 wherein said polymeric material is an acrylic acid-grafted ethylene oxide-propylene oxide copolymer having an average molecular weight of from about 200 to about 100,000 and a grafted acid content between about 1 and about 60.

9. The process of claim 1 wherein, prior to isolating the phases of the bi-phase system, the pH of the system is adjusted to modify the concentration of said metal values in one of said phases of said bi-phase system.

10. The process of claim 1 wherein the metal values are recovered from at least one of said isolated phases by precipitation of the metal values and subsequent filtration of the precipitate.

* * * * *